(12) United States Patent
Field et al.

(10) Patent No.: US 7,079,543 B1
(45) Date of Patent: Jul. 18, 2006

(54) METHOD AND SYSTEM FOR TRANSMITTING TRAFFIC HAVING DISPARATE RATE COMPONENTS

(75) Inventors: Barry W. Field, Windsor, CA (US); Kenneth M. Buckland, Santa Rosa, CA (US); Riccardo G. Dorbolo, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/390,420

(22) Filed: Sep. 3, 1999

(51) Int. Cl.
*H04L 12/28* (2006.01)
(52) U.S. Cl. ................ 370/395.6; 370/395.1; 370/395.61; 370/466; 370/474
(58) Field of Classification Search ........ 370/352–356, 370/395.1, 395.61, 395.63, 466, 474, 395.6, 370/528
See application file for complete search history.

(56) References Cited

U.S. PATENT DOCUMENTS

| | | | | |
|---|---|---|---|---|
| 5,263,081 A | * | 11/1993 | Nightingale et al. | |
| 5,528,579 A | * | 6/1996 | Wadman et al. | |
| 5,570,362 A | * | 10/1996 | Nishimura | |
| 5,577,039 A | * | 11/1996 | Won et al. | |
| 5,734,653 A | * | 3/1998 | Hiraiwa et al. | |
| 5,848,067 A | | 12/1998 | Osawa et al. | 370/394 |
| 5,892,771 A | * | 4/1999 | Beaupre et al. | 370/476 |
| 5,943,339 A | | 8/1999 | Mauger | 370/397 |
| 6,018,525 A | * | 1/2000 | Sucharczuk | 370/394 |
| 6,172,968 B1 | * | 1/2001 | Rasanen | |
| 6,243,382 B1 | * | 6/2001 | O'Neill et al. | |
| 6,272,128 B1 | * | 8/2001 | Pierson, Jr. | 370/352 |
| 6,404,782 B1 | * | 6/2002 | Berenbaum et al. | |
| 6,434,166 B1 | * | 8/2002 | Buckland et al. | 370/468 |
| 6,442,167 B1 | * | 8/2002 | Aramaki et al. | |
| 6,714,543 B1 | * | 3/2004 | Brueckheimer et al. | 370/395.1 |
| 6,778,503 B1 | * | 8/2004 | Sproat et al. | 370/247 |

OTHER PUBLICATIONS

ITU-T Recommendation I.363, "B-ISDN ATM Adaptation Layer (AAL) Specification," Mar. 1993, 100 pages.
Bellcore GR-253-CORE, "Synchronous Optical Network (SONET) Transport Systems: Common Generic Criteria," Issue 2, Dec. 1995 (with rev. Jan. 1999), 788 pages.
ATM Forum, "Circuit Emulation Service Interoperability Specification," Version 2.0, Jan. 1997, AF-VTOA-0078.000, 101 pages.
ATM Forum, "Specifications of (DBCES) Dynamic Bandwidth Utilization—in 64Kbps Time Slot Trunking over ATM—Using CES," Jul. 1997, AF-VTOA-0085.00, 32 pages.
Bellcore GR-2837, "ATM Virtual Path Ring Functionality in SONET—Generic Criteria," Feb. 1998, 154 pages.

(Continued)

*Primary Examiner*—Alpus H. Hsu
*Assistant Examiner*—Steve Blount
(74) *Attorney, Agent, or Firm*—Baker Botts L.L.P.

(57) ABSTRACT

A method and system for transmitting traffic having disparate rate components includes receiving a plurality of traffic streams. Each traffic stream includes a first component and a reduced rate second component associated with the first component. The first components of the traffic streams are segmented into successive cells. The second components of the traffic streams are distributed between a defined set of the cells for in-band transmission of the second components.

21 Claims, 3 Drawing Sheets

OTHER PUBLICATIONS

Power PC, POWERQUICC™, MPC860 User's Manual Motorola, © 1996, 1,143 pages, Jul. 1998.

International Telecommunication Union, Series I: Integrated Servicdes Digital Network, "B-ISDN operation and maintenance principles and functions," Feb. 1999, 116 pages.

"About ATM" www.atmforum.com/atmforum/library/notes1, 2, 3, 4 and 5 printed Aug. 30, 1999, 5 pages.

U.S. Appl. No. 09/419,204, entitled "Method and System for Distributed Processing of Traffic in a Telecommunications Node," filed Oct. 15, 1999, 37 pages. (0369).

U.S. Appl. No. 09/452,753 entitled "Method and System for Transporting Synchronous and Asynchronous Traffic on a Synchronous Bus of a Telecommunications Node," filed Dec. 1, 1999, 124 pages. (0363).

U.S. Appl. No. 09/452,759, entitled "Fused Switch Core and Method for a Telecommunications Node," filed Dec. 1, 1999, 114 pages. (0364).

U.S. Appl. No. 09/452,746, entitled "Method and System for Transporting Synchronus and Asynchronous Traffic on a Bus of a Telecommunications Node," filed Dec. 1, 1999, 122 pages. (0365).

U.S. Appl. No. 09/452,829, entitled "Rate Adjustable Backplane and Method for a Telecommunications Node," filed Dec. 1, 1999, 119 pages. (0366).

U.S. Appl. No. 09/452,830, entitled "Asynchronous Transfer Mode (ATM) Switch and Method for a Telecommunications Node," filed Dec. 1, 1999, 119 pages. (0367).

U.S. Appl. No. 09/452,751, entitled "Synchronous Switch and Method for a Telecommunications Node," filed Dec. 1, 1999, 119 pages. (0372).

U.S. Appl. No. 09/452,828, entitled "Time Slot Interchanger (TSI) and Method for a Telecommunications Node," filed Dec. 1, 1999, 117 pages. (0373).

U.S. Appl. No. 09/607,771, entitled "Method and System for Protection Switching in a Telecommunications Network," filed Jun. 30, 2000, 32 pages. (0388).

U.S. Appl. No. 09/628,532, entitled "Method and System for Reprogramming Instructions for a Switch," filed Jul. 31, 2000, 35 pages. (0370).

U.S. Appl. No. 09/657,068, entitled "Method and System for Processing Traffic in an Access Network," filed Sep. 7, 2000, 41 pages. (0362).

"Asynchronous Transfer Mode (ATM) Switching," printed from www.cisco.com on Aug. 27, 2002, 19 pages.

* cited by examiner

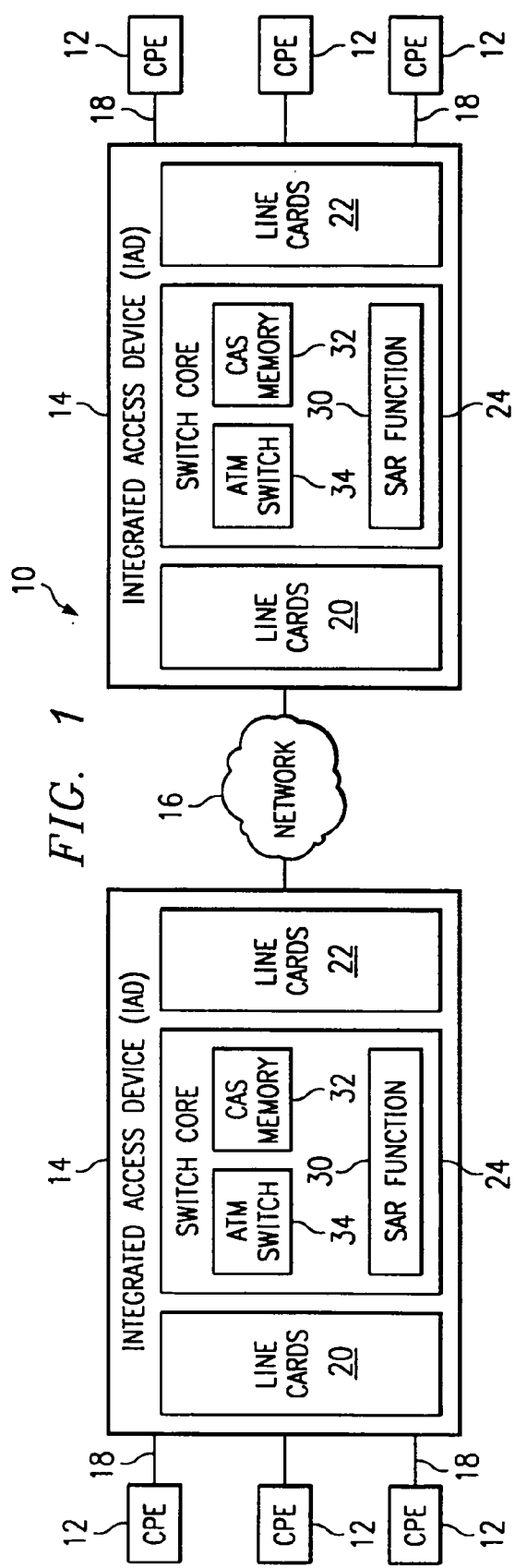

DS0-n VALUE ASSOCIATED WITH $CAS_N$ POSITION TO SN VALUE

| SN | $CAS_A$ | $CAS_B$ | $CAS_C$ | $CAS_D$ | $CAS_E$ | $CAS_F$ |
|---|---|---|---|---|---|---|
| 0 | 0 | 1 | 2 | 3 | 4 | 5 |
| 1 | 3 | 4 | 5 | 6 | 7 | 8 |
| 2 | 6 | 7 | 8 | 9 | 10 | 11 |
| 3 | 9 | 10 | 11 | 12 | 13 | 14 |
| 4 | 12 | 13 | 14 | 15 | 16 | 17 |
| 5 | 15 | 16 | 17 | 18 | 19 | 20 |
| 6 | 18 | 19 | 20 | 21 | 22 | 23 |
| 7 | 21 | 22 | 23 | 24 | 25 | 26 |
| 8 | 24 | 25 | 26 | 27 | 28 | 29 |
| 9 | 27 | 28 | 29 | 30 | 31 | 32 |
| 10 | 30 | 31 | 32 | 33 | 34 | 35 |
| 11 | 33 | 34 | 35 | 36 | 37 | 38 |
| 12 | 36 | 37 | 38 | 39 | 40 | 41 |
| 13 | 39 | 40 | 41 | 42 | 43 | UNDEF |
| 14 | 42 | 43 | UNDEF | 0 | 1 | 2 |
| 15 | 0 | 1 | 2 | 3 | 4 | 5 |

METHOD AND SYSTEM FOR TRANSMITTING TRAFFIC HAVING DISPARATE RATE COMPONENTS

TECHNICAL FIELD OF THE INVENTION

This invention relates generally to the field of telecommunications, and more particularly to a method and system for transmitting traffic having disparate rate components.

BACKGROUND OF THE INVENTION

The Internet has dramatically increased the potential for data, voice and video services for customers. Existing circuit-switched telephony systems, however, do not provide the foundation to support the growing need for bandwidth and new services required by both residential and business consumers. As a result, integrated access devices have been introduced to support Internet and related technologies as well as standard telephony service.

Integrated access devices often employ asynchronous transfer mode (ATM) functionality to multiplex data, voice and video traffic together onto a single network. ATM is a connection-oriented packet-switching technology in which information is organized into small, fixed length cells. ATM carries data asynchronously, automatically assigning data cells to available time slots on demand to provide maximum throughput. Compared with other network technologies, ATM provides large increases in maximum support bandwidth, support for multiple types of traffic such as data, video, and voice transmissions on shared communication lines, and virtual networking capabilities, which increase bandwidth utilization and ease network administration.

ATM adapts different types of traffic to fit into the standardized ATM cell format. The ATM cell is 53 bytes in length and includes a 5 byte header followed by a 48 byte payload. For particular types of traffic, the payload includes a traffic-specific ATM adaptation layer (AAL) that allows the traffic to be transmitted in the ATM cell and reconstituted at the far end of the ATM network.

ATM adaption layer 1 (AAL1) is a cell format used by ATM to transport telephony traffic. Telephony traffic is carried in DS-0 channels that include an 8 bit voice sample transported through the network at regular 125 microsecond intervals. In the case of structured AAL1, a number of such DS-0 bytes are group together in the payload of an ATM cell then carried through an ATM network in the ATM cell. The DS-0 bytes are fixed in alignment within the ATM cell payload to facilitate switching of the DS-0s.

A problem with AAL1 is a way in which it transmits Channel Associated Signaling (CAS) bits for the DS-0 channels. The CAS bits indicate the on or off hook status of a telephony line in connection with a DS-0 and are provided at a reduced rate in comparison to the DS-0 in accordance with telephony standards. In AAL1, the CAS bits are transmitted by inserting them, all at once for all of the DS-0s, at the end of a superframe period. This insertion of superframe information results in an instantaneous increase in bandwidth of fifty percent, with each 8 bit DS-0 having an associated 4 bit CAS, and creates jitter in the AAL1 connection. The resulting increase in bandwidth is particularly problematic in AAL1 intensive applications where CAS-related bursts can significantly affect other ATM traffic. Burst also requires the system to buffer traffic cells, which causes delay between a speaker and a listener. Such latency is undesirable.

SUMMARY OF THE INVENTION

The present invention provides an improved method and system for transmitting telephony and other types of traffic having disparate rate components that substantially eliminate or reduce disadvantages and problems associated with previous systems and methods. In particular, superframe and other slower rate traffic is distributed between asynchronous transfer mode (ATM) adaption layer (AAL) cells in a superframe and transmitted in-band to eliminate jitter.

In accordance with one embodiment of the present invention, a method for transmitting traffic having disparate rate components includes receiving a plurality of traffic streams. Each traffic stream includes a first component and a reduced rate second component associated with the first component. The first components of the traffic streams are segmented into successive cells. The second components of the traffic streams are distributed between a defined set of the cells for in-band transmission of the second components.

More specifically, in accordance with a particular embodiment of the present invention, the defined set of cells is a segmented superframe and the second components are substantially evenly distribute between cells in the superframe. In this embodiment, the first components may occupy a fixed position within each cell to facilitate processing and switching of the frames. The first components may be DS-0s with the reduced rate second components being the Channel Associated Signaling (CAS) values for the DS-0s. In this implementation, the cells may be circuit emulation service cells that are functionally equivalent to those in a standards-based implementation of ATM adaption layer 1 (AAL1).

Technical advantages of the present invention include providing an improved method and system for transmitting traffic having disparate rate components. In particular, superframe information and/or other reduced rate components of a traffic stream is distributed between frames in a superframe and carried in-band to eliminate the bulk insertion of such information after each superframe. As a result, jitter and cell clumping caused by superframe insertion is eliminated. Moreover, the elimination of superframe information allows frame size to exactly correspond to payload. As a result, the start of the frame is constant and known, which eliminates cell float and the need for a superframe pointer.

Another technical advantage of the present invention includes providing an improved method and system for transporting telephony traffic in an ATM adaption layer (AAL) cell. In particular, the Channel Associating Signaling (CAS) values are distributed between frames and transmitted in-band to eliminate the jitter and cell clumping of an AAL1 stream. In addition, because the resulting frame size may now exactly correspond to the ATM payload, the start of the frame may be constant and the Convergence Sublayer Indicator (CSI) pointer eliminated. This allows a four bit sequence count to be used in an AAL header to support both North American and European standards. Having the frame size correspond to the cell payload size also provides a number of specific implementation advantages including that no real frame processing is required, dejittering can be performed in a straight-forward manner, DS-0s can be transmitted on regular 125 microsecond intervals with no delays incurred, and less dejittering memory is required.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 1 is a block diagram illustrating a telecommunications system in accordance with one embodiment of the present invention;

FIG. 2 is a block diagram illustrating header and payload portions of an asynchronous transport mode (ATM) cell for transmission in the telecommunications system of FIG. 1;

FIG. 3 is a block diagram illustrating header and payload portions of an ATM adaption layer (AAL) cell for insertion into the ATM cell payload of FIG. 2;

DETAILED DESCRIPTION OF THE INVENTION

Figure 4:
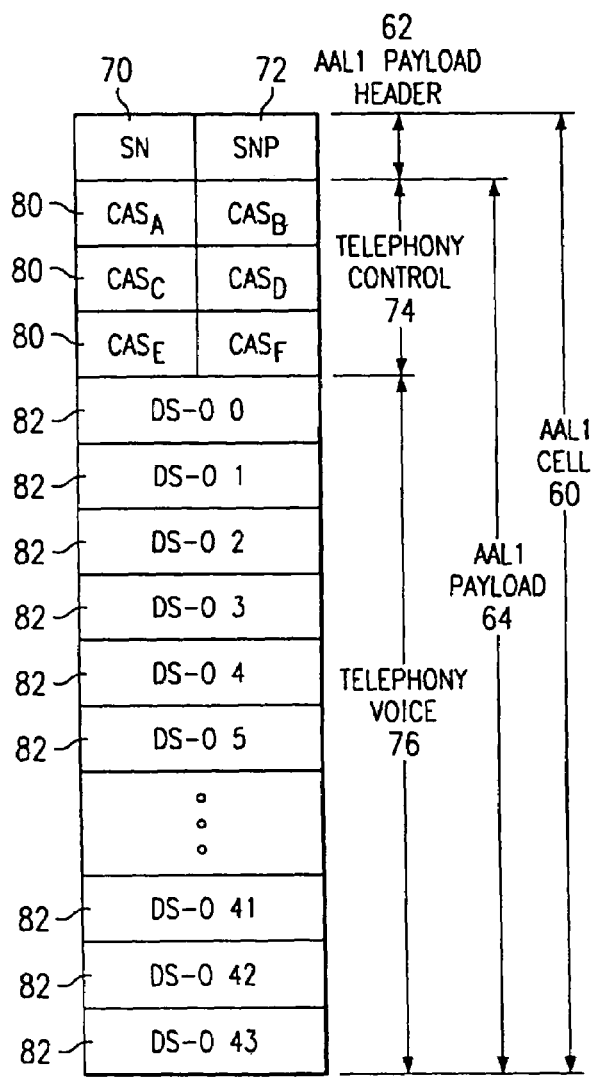
FIG. 4 is a block diagram illustrating in-band transmission of Channel Associated Signaling (CAS) values along with the DS-0s in the AAL cell of FIG. 3 in accordance with one embodiment of the present invention.

FIG. 1 illustrates a telecommunication system 10 in accordance with one embodiment of the present invention. The telecommunication system 10 transmits voice, data, video, other suitable types of information, and/or a combination of different types of information between source and destination points.

Referring to FIG. 1, the telecommunication system 10 includes customer premise equipment (CPE) 12 and integrated access devices (IADs) 14 connecting the customer premise equipment 12 to a network 16. The network 16 may include portions of the Internet, one or more Intranets or other wide or local area networks and the like. In a particular embodiment, the network 16 includes backbone routers at its borders for communicating with the integrated access devices 14. The backbone routers are Cisco 12000 or other suitable routers capable of routing traffic to and from a number of access devices.

The customer premise equipment 12 includes standard telephones, modems, computers, data phones and other devices capable of generating traffic for transmission in the telecommunications system 10. The customer premise equipment 12 is connected to the integrated access devices 14 through a communication link 18. The communication link 18 may be T1 line, conventional twisted pair cable or other suitable type of wireline or wireless link.

For a standard telephony connection, a telephone is connected to customer premise equipment 12. The customer premise equipment 12 generates a DS-0 stream along with Channel Associated (CAS) values for the DS-0 stream. The DS-0 streams each provide an 8 bit voice sample every 125 microseconds. The CAS values provide on and off hook status information for setting up and breaking down the connection. The CAS values are transmitted by the customer premise equipment 12 as superframe information. Superframe information is a reduced rate component of a traffic stream that is transmitted and/or received all at once after a defined number of frames which together form a superframe. The superframe information typically provides control information for the higher rate component of the traffic stream. In accordance with North American telephony standards, a superframe includes 24 frames. In accordance with the European telephony standards, a superframe includes 16 frames. In either case, four (4) CAS bits are transmitted for every DS-0, once per superframe.

The integrated access devices 14 each include customer line cards 20, network line cards 22, and a switch core 24. In a particular embodiment, the integrated access devices 14 are each a Cisco 6732 integrated access device. It will be understood that other types of suitable integrated and other access devices may be used in connection with the present invention.

The customer line cards 20 are connected to the customer premise equipment 12 and are adapted to communicate voice, data, or video traffic with the customer equipment 12. The network line cards 22 are connected to the network 16 and communicate service traffic with the network 16 in the asynchronous transport mode (ATM) or other suitable format. Typically, the network line cards 22 are high speed line cards capable of handling traffic for a number of customer line cards 20.

For handling telephony traffic in the ATM format, the switch core 24 includes a segment and reassembly (SAR) function 30, CAS storage 32, and an ATM switch 34. The SAR function 30 segments incoming DS-0 streams into discrete ATM adaption layer (AAL) cells for transmission on the network 16 and reassembles the AAL cells received from the network 16 for delivery to the customer premise equipment 12. The SAR function 30 also stores received CAS values in CAS storage 32. The CAS storage 32 is a scratch pad or other suitable memory capable of storing a current CAS value for each DS-0 channel. The stored CAS value for each DS-0 is updated upon receipt of a new CAS value for the DS-0.

The ATM switch 34 includes conventional functionality for switching ATM traffic as well as additional functionality for recognizing and processing in-band CAS values and a four (4) bit sequence count in AAL cells. In one embodiment in-band CAS values are recognized based on the virtual path indicator (VPI) and/or the virtual channel indication (VCI) in the cell header. The position of the CAS values is predefined and fixed within each frame. As described in more detail below, the frame number in the superframe explicitly determines the DS-0 with which CAS value is associated. The CAS values are stored in the CAS memory 32 as previously described.

FIG. 2 illustrates a standard ATM cell 50 for transmission within the telephony system 10. The ATM cell 50 includes an ATM cell header 52 followed by an ATM cell payload 54. The ATM cell header 52 comprises 5 bytes of addressing information for routing the ATM cell within the telecommunication system 10. The ATM cell payload includes 48 bytes for transporting voice, data, video and other suitable types of information and associated data. Further information regarding the ATM standard, the ATM cell, and ATM switching may be obtained from the ATM Forum.

FIG. 3 illustrates an AAL cell 60 for transport within the ATM cell payload 54 of the ATM cell 50 in accordance with one embodiment of the present invention. In this embodiment, the AAL cell 60 is a circuit emulation service cell for telephony or other constant bit rate traffic and is functionally equivalent to a standardized AAL1 cell as specified by the ATM Forum. The AAL cell 60 provides an adaptation layer for transporting DS-0 telephony traffic in the ATM cell 50.

The AAL cell 60 includes an AAL (SAR-PDU) header 62 and an AAL (SAR-PDU) payload 64. The AAL header 62 includes one (1) byte of information to enable reconstitution of the DS-0 channels at a destination node. The AAL payload 64 includes 47 bytes of information. Information concerning the ATM adaption layers and the AAL1 standard may be obtained from the ATM Forum.

FIG. 4 illustrates details of the AAL cell 60 in accordance with a particular embodiment of the present invention. As described in more detail below, CAS values for a portion of the DS-0s are carried in-band in each AAL cell with each successive cell carrying CAS values for a successive set of DS-0s. As used herein, the term each means every one of at least a subset of the identified items. Thus, all the cells and/or frames need not carry CAS value or the same number of CAS values. In this way, the CAS values for all of the DS-0s are carried in-band within a defined number of cells that together form the superframe. The in-band transmission of the CAS values does not create jittering the AAL cell stream, simplifies AAL cell processing and minimizes delay.

Referring to FIG. 4, the AAL cell 60 includes the AAL payload header 62 and the AAL payload 64. As described in more detail below, the AAL payload header 62 includes a sequence number (SN) field 70 and a sequence number protection (SNP) field 72. The SN and SNP fields 70 and 72 may include standard information or may, as described in more detail below, be suitably modified for improved efficiency.

The AAL payload 64 includes a telephony control portion 74 and a telephony voice portion 76. The telephony control portion 74 includes in-band CAS values 80 transmitted within the AAL cell 60. The four bit CAS values 80 each are repeated in a same or different frame to form a full byte that makes feasible or facilitates switching and reconstitution of the DS-0 at a destination node. The telephony voice portion 76 includes a set of DS-0s 82 with which the successive CAS values 80 are associated.

In a particular embodiment, the superframe is constructed such that the CAS value for each DS-0 appears at least once every sixteen (16) cells. This is assuming that a given DS-0 is placed in every cell. This is done because the CAS value is updated once every sixteen (16) DS-0s by European data circuit terminating equipment (DCE). In North America, the DCE updates the CAS value once every twenty-four (24) DS-0. By updating the CAS value at least once every sixteen (16) DS-0s, compliance is ensured for both systems.

In this dual accommodation embodiment, the AAL payload 64 includes CAS values 80 for up to six (6) DS-0s and 44 DS-0s 82. In this embodiment, a superframe consist of sixteen (16) frames with each frame having an AAL cell. Preferably, the number of the frame within the superframe explicitly determines the DS-0 82 that each CAS value 80 is associated. For the illustrated embodiment, CAS values 80 may be associated with DS-0s 82 based on a modulo sixteen (16) counter as illustrated by the table of FIG. 5.

Figures 5, 6:
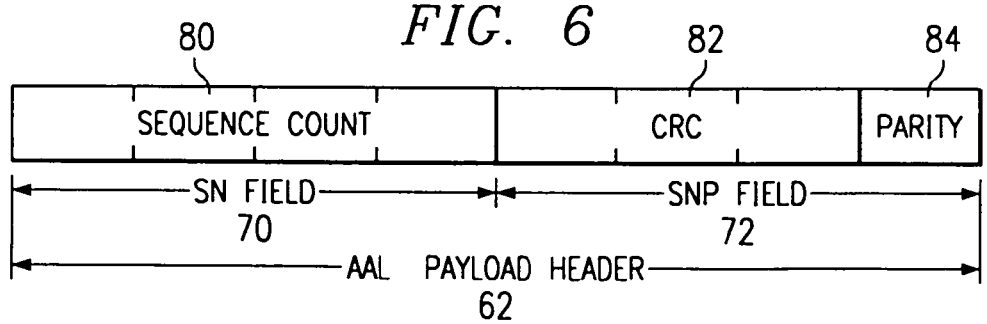
FIG. 5 is a table illustrating association of the CAS values with the DS-0s for each frame within a superframe.
FIG. 6 is a block diagram illustrating details of the payload header of the AAL cell in FIG. 4 in accordance with one embodiment of the present invention.

Referring to FIG. 5, the first frame, Frame Number "0" includes CAS values 80 for DS-0s 0–5. The successive frames includes CAS values 80 for the next three (3) DS-0s 82 as well as repeats of three (3) previous CAS values. In this way, all of the CAS values for the 44 DS-0s are transmitted and repeated within the superframe and substantially evenly distributed between each frame with two (2) CAS slots being unused. It will be understood that the in-band CAS values 80 may be otherwise suitably associated with their DS-0s. For example, three (3) CAS values may be transmitted and repeated in each frame.

In general, the minimum number of CAS values 80 that allows repeating to make feasible or facilitate switching is equal to the number of DS-0s carried in an AAL frame divided by the number of frames in a superframe, with the quotient rounded up to a whole number. For North American standards, the minimum number of CAS values 82 in a AAL is equal to two (2). This allows 45 DS-0s 82 to be carried within each cell. For European telephony standards, the minimum number of CAS values 82 carried in each AAL cell is equal to three (3). This allows 44 DS-0s 82 to be carried within each cell, which is the illustrated embodiment and the more general case.

In addition to eliminating superframe jitter, transporting the CAS values 80 in-band allows the frame size to exactly correspond to the 48 byte ATM cell payload 54. This means that start of the frame is fixed and thus always known, for example, the fifth byte for the illustrated embodiment. This simplification is not possible with standard structured AAL1 because, even if the frame size is matched to the available cell payload size, the CAS burst throws off the relationship.

FIG. 6 illustrates the AAL payload header 62 in accordance with one embodiment of the present invention. In this embodiment, the AAL payload header 62 includes the SN field 70 and SNP field 72. Because, as previously described, the cell payload exactly corresponds to a frame, the frame pointer is not required. Accordingly, the SN field 70 is modified from the AAL1 standard to remove the Convergence Sublayer Indicator (CSI) bit, used to indicate a pointer byte, and includes a four (4) byte sequence count. The four bit sequence count facilitates a sixteen (16) frame count, which is ideal for the CAS transfer rate required by European standards and which is a more general case compared to the twenty-four (24) frame count of the North American standards. The SN field 72 includes a three (3) byte CRC value 82 and a parity byte 84 in accordance with the AAL1 standards.

The simplification of having the frame size correspond to the cell payload size provides a number of implementation advantages. For example, there is no need to find a frame boundary within a continuous AAL cell stream as the frame boundaries are explicitly defined by the cell payload. Accordingly, no real frame processing is required. In addition, because the frame boundaries correspond to AAL payload boundaries, an AAL reassembly processor that terminates an AAL VC can be readily constructed from a single modified ATM switch 24 design that recognizes and processes in-band CAS values and the four (4) bit sequence counter. Since the ATM switch 24 queues up cell streams, a single AAL VC can be queued up in a dedicated queue. Each cell in this queue would then constitute 125 microsecond frame, and if cells are removed from the queue at regular 125 microsecond intervals, AAL dejittering can be performed in a straight-forward manner. Moreover, because each cell contains a 125 microsecond frame period, each frame of DS-0s can be transmitted regularly at 125 microsecond intervals. No delays are incurred while waiting for other frames whose contents are required to fill up the payload. This is true both at the AAL segmentation and the AAL reassembly points.

Figure 7:
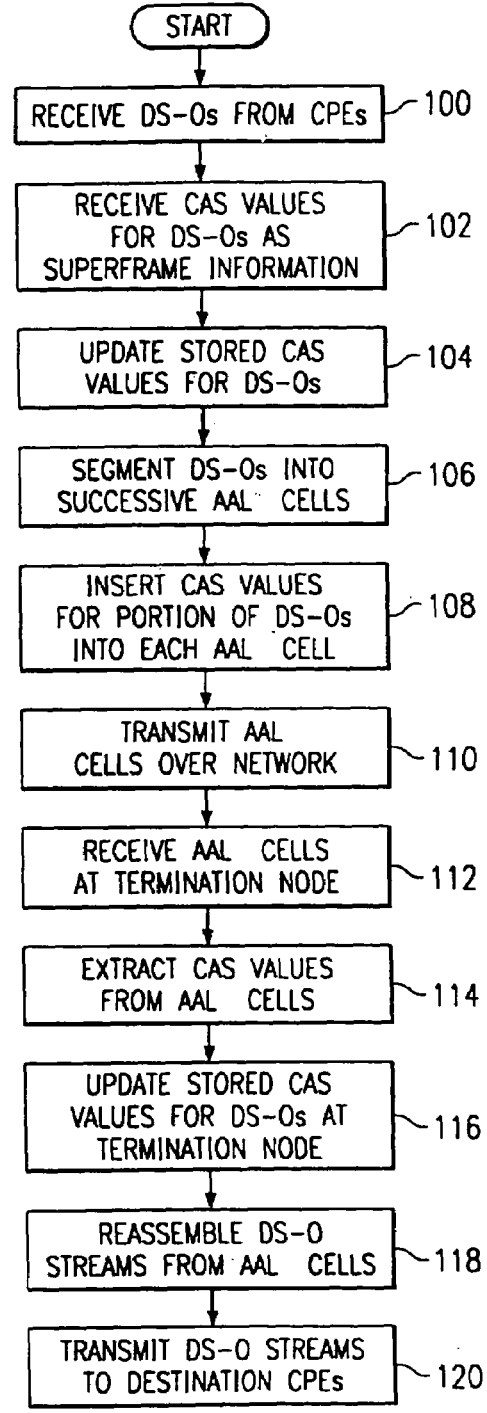
FIG. 7 is a flow diagram illustrating in-band transmission of CAS values in accordance with one embodiment of the present invention.

FIG. 7 is a flow diagram illustrating transmission of DS-0s in the ATM format in accordance with one embodiment of the present invention. It will be understood that the method and system of the present invention may be used in connection with other suitable types of traffic including superframe information or other types of multiple rate components.

Referring to FIG. 7, the method begins at step 100 in which a plurality of DS-0 channels are received from the customer premise equipment 12. At step 102, the CAS values for the DS-0 channels are received from the customer premise equipment 12 as superframe information. Next, at step 104, the CAS values for each DS-0 are updated in the CAS memory 32 based on the received CAS values. Thus, the CAS memory 32 always includes updated CAS values for the DS-0 channels.

Proceeding to step 106, the DS-0 streams are segmented into successive AAL cells. At step 108, the CAS values associated with a portion of the DS-0s are inserted into each AAL cell in a superframe according to the sequence specified by the table of FIG. 5 or other suitable sequence. The included CAS values are read out of the CAS memory 32 into the AAL cells. Next, at step 110, the AAL cells are transmitted over the network 16.

Proceeding to step 112, the AAL cells are received at a termination node and identified as including in-band CAS values. In a particular embodiment, AAL cells having in-band CAS values are identified based on the VPI and/or the VCI of the cell. Next, at step 114, the CAS values are extracted from the AAL cells. At step 116, CAS values are updated at the termination node for each DS-0 based on the extracted CAS values. Thus, the CAS storage 32 at the destination node includes updated CAS value for each DS-0. The CAS values are used at the destination node to determine the status of the telephone call.

Proceeding to step 118, the termination node reassembles at DS-0s streams for delivery to the customer premise equipment 12. The DS-0 streams are transmitted to the customer premise equipment 12 at step 120. In this way, the CAS values are carried in-band to provide a jitter free version of structured AAL1. It will be understood that other types of traffic streams with disparate rate components may be reformatted for in-band transmission of a slower component to provide jitter free transmission of the stream in accordance with the present transmission.

Although the present invention has been described with several embodiments, various changes and modifications may be suggested to one skilled in the art. It is intended that the present invention encompass such changes and modifications as fall within the scope of the appended claims.

The invention claimed is:

1. A method for transmitting traffic having disparate rate components, comprising:
   receiving a plurality of traffic streams, each traffic stream including a first component and a reduced rate second component associated with the first component, wherein the first component is a DS-0 and the reduced rate second component is the Channel Associated Signaling (CAS) value for the DS-0;
   segmenting the first components of the traffic streams into successive cells; and
   distributing the second components of the traffic streams between a defined set of the cells for in-band transmission of the second components in a payload of each of the cells, the second components being positioned at the beginning of the payload of each cell.

2. The method of claim 1, further comprising substantially evenly distributing the second components of the traffic streams between the defined set of cells.

3. The method of claim 1, further comprising segmenting the first component of each traffic stream into a fixed position in the successive cells.

4. The method of claim 1, wherein the defined set of cells is a superframe, further comprising transmitting successive superframes without insertion of intervening superframe information.

5. The method of claim 1, wherein distributing the second component of the traffic streams between the defined set of cells comprises including in each cell payload the second component for a portion of the traffic streams such that the second components for all of the traffic streams are included within the defined set of cells.

6. The method of claim 1, wherein the reduced rate second component comprises information received as superframe information.

7. The method of claim 1, wherein the reduced rate second component comprises control information for the first component.

8. The method of claim 1, wherein the cell is asynchronous transfer mode (ATM) cell.

9. The method of claim 1, wherein the first component is a DS-0, the reduced rate second component is the CAS value for the DS-0, and the cell is an ATM adaption layer (AAL) cell.

10. The method of claim 9, further comprising repeating included CAS values in each AAL cell.

11. The method of claim 9, further comprising providing a 4 bit sequence count in an AAL header for the AAL cell.

12. The method of claim 1, further comprising:
    storing a current value for the reduced rate second components for each traffic stream in a memory; and
    retrieving the second components of traffic streams for inclusion in the cells from the memory.

13. A method for reformatting telephony traffic into asynchronous transport mode (ATM) adaption layer (AAL) cells for transmission on a network, comprising:
    receiving a plurality of telephony streams, each telephony stream including a DS-0 channel and a Channel Associated Signaling (CAS) value for the DS-0 channel;
    segmenting the DS-0 channels into successive AAL cells; and
    including in a payload of each AAL cell the CAS value for a portion of the DS-0 channels such that the CAS values for all of the DS-0 channels are included within a superframe of AAL cells, the CAS values being positioned at the beginning of the payload of each AAL cell.

14. The method of claim 13, wherein the superframe contains 24 AAL cells.

15. The method of claim 13, wherein the superframe contains 16 AAL cells.

16. A telecommunications device, comprising:
    one or more ports receiving a plurality of traffic streams, each traffic stream including a first component and a reduced rate second component associated with the first component, wherein the first component is a DS-0 and the reduced rate second component is the Channel Associated Signaling (CAS) value for the DS-0; and
    a reformatting device operable to segment the first components of the traffic streams into successive cells and to distribute the second components of the traffic streams between a defined set of cells for in-band transmission of the second components in a payload of each of the cells, the second components being positioned at the beginning of the payload of each cell.

17. The telecommunications device of claim 16, further comprising the reformatting device operable to substantially evenly distribute the second components of the traffic streams between the defined set of cells.

18. The telecommunications device of claim 16, further comprising the reformatting device operable to segment the first components of each traffic stream into a fixed position in the successive cells.

19. The telecommunications device of claim 16, the reformatting device operable to include in each cell payload the second component for a portion of the traffic streams such that the second components for all of the traffic streams are included within the defined set of cells.

20. The telecommunications device of claim 16, wherein the first component is a DS-0, the reduced rate second component is the CAS value for the DS-0 and the cell is an ATM adaption layer (AAL) cell.

21. The telecommunications device of claim 20, the reformatting device operable to provide a 4 bit sequence count in an AAL header for the AAL cell.

* * * * *